United States Patent [19]

Takeda et al.

[11] Patent Number: 5,243,019
[45] Date of Patent: Sep. 7, 1993

[54] ALKENYL-FLUORINE-CONTAINING AROMATIC POLYAMIDE

[75] Inventors: Shinji Takeda, Tsukuba; Masami Yusa, Shimodate; Yasuo Miyadera, Tsukuba, all of Japan

[73] Assignee: Hitachi Chemical Company, Ltd., Tokyo, Japan

[21] Appl. No.: 674,604

[22] Filed: Mar. 25, 1991

[51] Int. Cl.$^5$ ............................................. C08G 69/32
[52] U.S. Cl. ..................... 528/205; 528/26; 528/38; 528/208; 528/345; 528/348
[58] Field of Search ............... 528/205, 345, 208, 348, 528/26, 38

[56] References Cited

U.S. PATENT DOCUMENTS 4,393,194 7/1983 Gaudiana et al. ................ 528/205

Primary Examiner—Harold D. Anderson
Attorney, Agent, or Firm—Antonelli, Terry, Stout & Kraus

[57] ABSTRACT

A fluorine-containing aromatic polyamide obtained by reacting an aromatic dicarboxylic acid having a perfluoroalkenyloxy group with a diamine is excellent in water repellency, water resistance, heat resistance, etc.

8 Claims, 3 Drawing Sheets

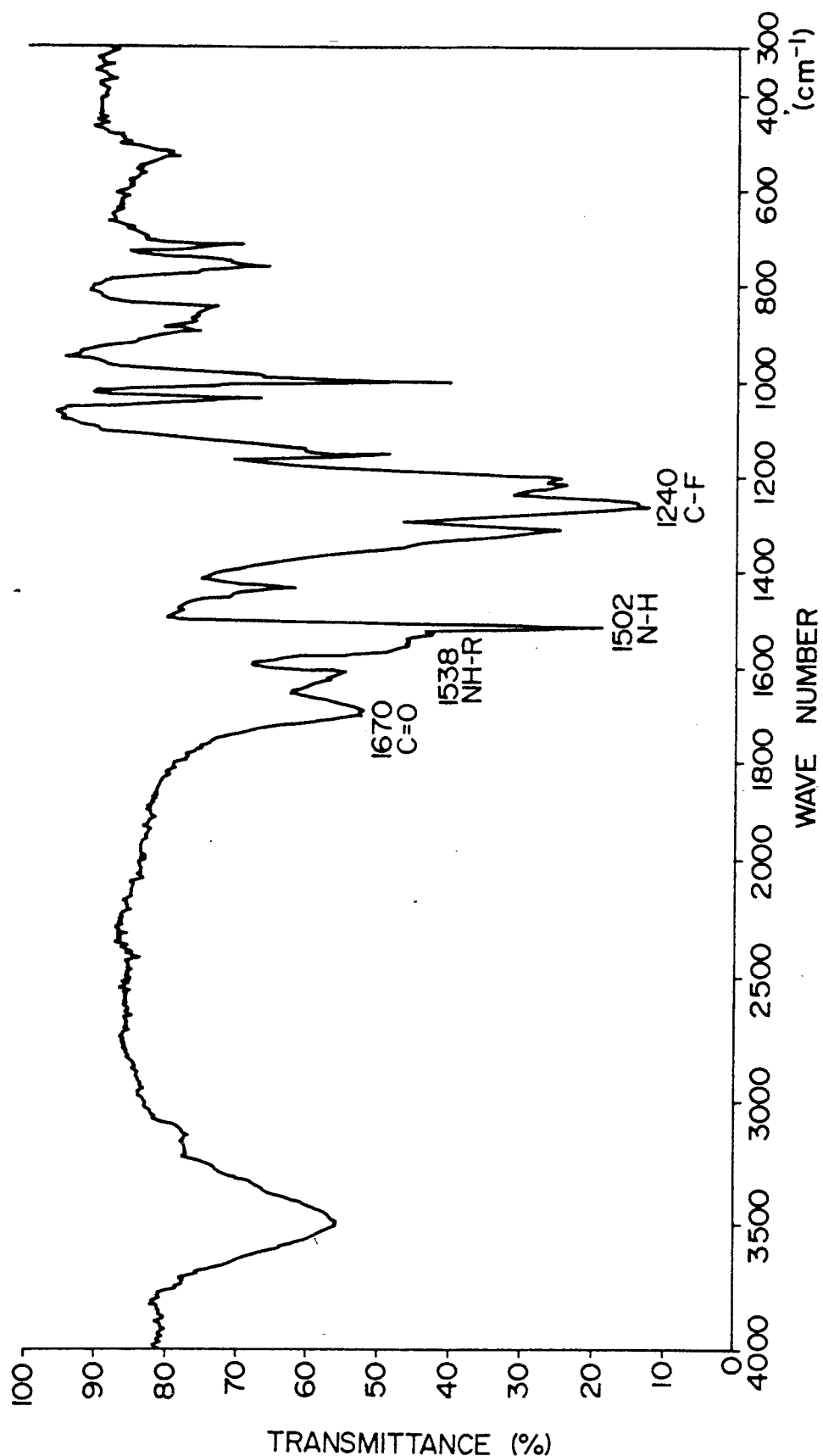

ALKENYL-FLUORINE-CONTAINING AROMATIC POLYAMIDE

BACKGROUND OF THE INVENTION

This invention relates to a novel fluorine-containing aromatic polyamide and production process thereof.

Aromatic polyamides have so far been used in the fields of fiber and coatings as an excellent material having a high strength, a high elastic modulus, a high heat resistance and a flame retardance.

On the other hand, fluorine-containing polymers are excellent in heat resistance, chemical resistance, water-repellent and oil-repellent properties, unstickness, etc. Making most of these unique properties, they are extensively used as a high-functionality polymer.

In the recent time, however, there is an intense desire to enhance the functionality of aromatic polyamides, such as improvement of moisture resistance, etc. As an aromatic polyamide granting such a request, an aromatic polyamide having hexafluoropropylidene groups in its molecular chain and an aromatic polyamide of which main chain involves aromatic rings with directly linked fluorine atoms are proposed for the reason of availability of starting materials, for example in Japanese Patent Application Kokai (Laid-Open) No. 62-169122. According to the finding of the present inventors, however, these aromatic polyamides cannot sufficiently fulfil the above-mentioned requirements.

SUMMARY OF THE INVENTION

This invention provides a novel fluorine-containing aromatic polyamide as a material sufficiently fulfilling the above-mentioned requirements, and a production process thereof.

This invention provides a fluorine-containing aromatic polyamide having repeating units represented by the following formula:

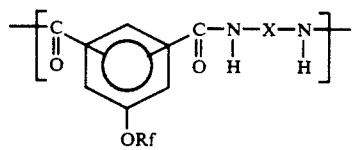

(I)

wherein Rf represents $-C_nF_{2n-1}$ (n is an integer of 6–12) which has one double bond and may optionally be branched, provided that the hydrogen atoms of the benzene ring may optionally be substituted by appropriate substituents; and X represents a divalent organic group. As the substituents optionally linked to the benzene ring, lower alkyl groups, lower alkoxy groups, halogen atoms, and the like can be referred to.

This invention further provides a process for producing the above-mentioned fluorine-containing aromatic polyamide.

BRIEF DESCRIPTION OF THE DRAWINGS

FIG. 3 illustrates infrared absorption spectrum of Polyamide (16) obtained in Example 16.

DESCRIPTION OF THE PREFERRED EMBODIMENTS

Figure 1:
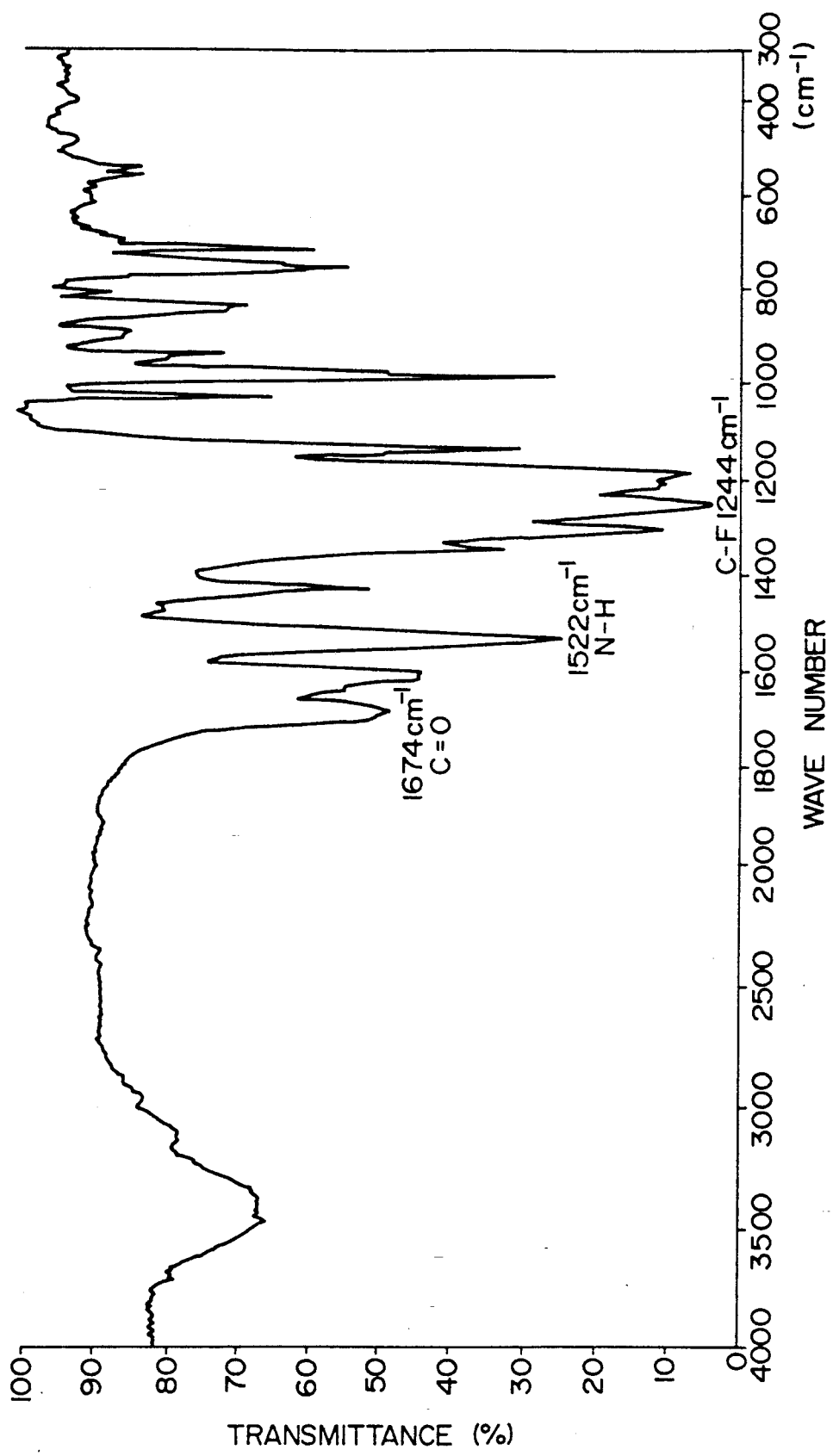
FIG. 1 illustrates infrared absorption spectrum of Polyamide (9) obtained in Example 9.

The fluorine-containing aromatic polyamide of this invention has repeating units of the formula:

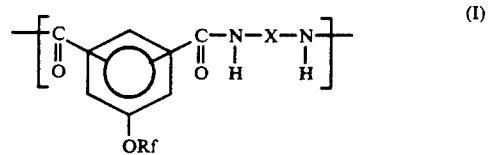

(I)

wherein Rf represents $-C_nF_{2n-1}$ (n is an integer of 6-12) which has one double bond and may optionally be branched, provided that the hydrogen atoms of the benzene ring may optionally be substituted by appropriate substituents; and X represents a divalent organic group.

As X in formula (I), groups having aromatic ring(s) are preferable from the viewpoint of heat resistance. Among them, particularly preferable are a phenylene group, groups represented by general formula (a):

(a)

wherein Y represents a direct link, $-O-$, $-S-$, $-SO_2-$,

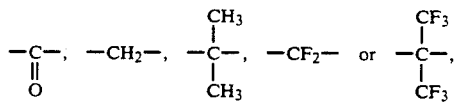

groups represented by general formula (b):

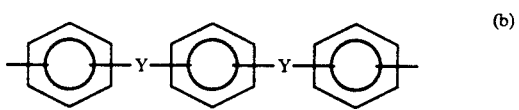

(b)

wherein Y is as defined in formula (a) and the symbols Y in a number of two may be identical or different, and groups represented by general formula (c):

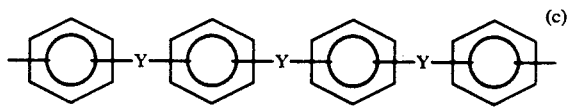

(c)

wherein Y is as defined in formula (a) and the symbols Y in a number of three may be identical or different, provided that the hydrogen atoms of benzene rings in these groups may optionally be substituted by appropriate substituents. As the substituents which may optionally be linked to the benzene rings, lower alkyl groups, lower alkoxy groups, halogen atoms and the like can be referred to. When X in formula (I) satisfies the above-mentioned conditions, such a unit represented by formula (I) is hereinafter referred to as "repeating unit (α)".

The fluorine-containing aromatic polyamide may additionally have a repeating unit represented by the following formula (II):

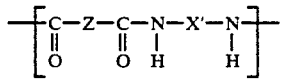
(II)

wherein Z is a divalent organic group having aromatic ring and different from the

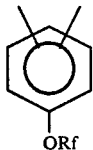

in formula (I), and X' represents a divalent organic group having aromatic ring.

As Z and X' in formula (II), groups having aromatic ring(s) are preferable from the viewpoint of heat resistance. Among them, particularly preferable are phenylene group, groups represented by formula (a), groups represented by formula (b) and groups represented by formula (c), provided that the hydrogen atoms of benzene ring(s) in these groups may optionally be substituted by appropriate substituents. As the substituent which may optionally be linked to the benzene ring(s), lower alkyl groups, lower alkoxy groups, halogen atoms and the like can be referred to. Z and X', each in a plural number, may be identical or different. When Z and X' in formula (II) independently satisfy the above-mentioned conditions, such a unit of formula (II) is hereinafter referred to as "repeating unit ($\beta$)".

Preferably, the content of the repeating unit represented by formula (I) or the content of repeating unit ($\alpha$) are 1% by mole or above, based on the total quantity of the repeating unit represented by formula (I) or repeating unit ($\alpha$) and the repeating unit represented by formula (II) or repeating unit ($\beta$). If the content of the repeating unit represented by formula (I) or repeating unit ($\alpha$) is lower than the above, the fluorine-containing polyamide is low in moisture resistance. The content of the repeating unit of formula (I) or repeating unit ($\alpha$) is more preferably 10% by mole or above, and particularly preferably 20% by mole or above.

The fluorine-containing aromatic polyamide of this invention can be produced by reacting an aromatic dicarboxylic acid component comprising an aromatic dicarboxylic acid represented by the following formula (III):

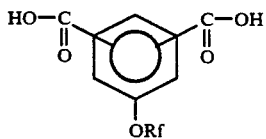
(III)

wherein Rf is as defined in formula (I) and the hydrogen atoms of the benzene ring may optionally be substituted by appropriate substituents, or its amide-formable derivative and, if desired, an aromatic dicarboxylic acid represented by the following formula (IV):

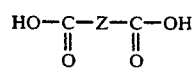
(IV)

wherein Z is as defined in formula (II), or its amide-formable derivative with an aromatic diamine component represented by the following formula (V):

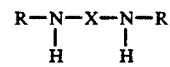
(V)

wherein R represents hydrogen or trialkylsilyl groups and X is as defined in formula (I).

As the substituent which may optionally be linked to benzene ring in formula (III), lower alkyl groups, lower alkoxy groups, halogen atoms and the like can be referred to.

As the aromatic dicarboxylic acid component, an aromatic dicarboxylic acid represented by formula (III) or its amide-formable derivative is preferably used in an amount of 1–100% by mole, more preferably in an amount of 10–100% by mole, and particularly preferably in an amount of 20–100% by mole.

Examples of the aromatic dicarboxylic acid represented by formula (III) include 5-(perfluorononenyloxy)-isophthalic acid, 4-(perfluorononenyloxy)-phthalic acid, 2-(perfluorononenyloxy)terephthalic acid, 4-methyl-5-(perfluorononenyloxy)isophthalic acid, 4-methoxy-5-(perfluorononenyloxy)isophthalic acid, 2,4,6-trifluoro-5-(perfluorononenylxoy)isophthalic acid, 4-chloro-5-(perfluorononenyloxy)isophthalic acid, 4-bromo-5-(perfluorononenyloxy)isophthalic acid, 4-methyl-5-(perfluorononenyloxy)phthalic acid, 4-methoxy-5-(perfluorononenyloxy)phthalic acid, 3,4,6-trifluoro-5-(perfluorononenyloxy)phthalic acid, 4-chloro-5-(perfluorononenyloxy)-phthalic acid, 4-bromo-5-(perfluorononenyloxy)-phthalic acid, 2-methyl-5-(perfluorononenyloxy)-terephthalic acid, 4-methoxy-5-(perfluorononenyloxy)-terephthalic acid, 2,3,6-trifluoror-5-(perfluorononeyloxy)-terephthalic acid, 2-chloro-5-(perfluorononenyloxy)-terephthalic acid, 2-bromo-5-(perfluorononenyloxy)-terephthalic acid, 5-(perfluorohexenyloxy)-isophthalic acid, 4-(perfluorohexenyloxy)-phthalic acid, 2-(perfluorohexenyloxy)terephthalic acid, 4-methyl-5-(perfluorohexenyloxy)isophthalic acid, 4-methoxy-5-(perfluorohexenyloxy)isophthalic acid, 2,4,6-trifluoro-5-(perfluorohexenyloxy)isophthalic acid, 4-chloro-5-(perfluorohexenyloxy)isophthalic acid, 4-bromo-5-(perfluorohexenyloxy)isophthalic acid, 4-methyl-5-(perfluorohexenyloxy)phthalic acid, 4-methoxy-5-(perfluorohexenyloxy)phthalic acid, 3,4,6-trifluoro-5-(perfluorohexenyloxy)phthalic acid, 4-chloro-5-(perfluorohexenyloxy)-phthalic acid, 4-bromo-5-(perfluorohexenyloxy)-phthalic acid, 2-methyl-5-(perfluorohexenyloxy)-terephthalic acid, 4-methoxy-5-(perfluorohexenyloxy)-terephthalic acid, 2,3,6-trifluoro-5-(perfluorohexenyloxy)-terephthalic acid, 2-chloro-5-(perfluorohexenyloxy)-terephthalic acid, 2-bromo-5-(perfluorohexenyloxy)-terephthalic acid, and the like.

In the compounds exemplified above, the term "perfluorononenyl" means —$C_9F_{17}$ group, and the term "perflurohexenyl" means —$C_6F_{11}$ group. Compounds having —$C_{10}F_{19}$ group, —$C_{12}F_{23}$ group and the like in their place can also be exemplified similarly.

The above-mentioned perfluorononenyloxyisophthalic acid and perfluorohexenyloxyisophthalic acid can be produced by reacting a trimer or a dimer of hexafluoropropene and hydroxyisophthalic acid in an aprotic polar solvent at a temperature not exceeding ambient temperature in the presence of a basic catalyst such as triethylamine according to the method mentioned in Japanese Patent Application Kokai (Laid-Open) No. 60-51146.

Other dicarboxylic acids can also be produced by using other oligomers, than dimer and trimer, of hexafluoropropene or other fluoroalkene oligomers in the method mentioned above.

Further, the aromatic dicarboxylic acids represented by formula (III) can be produced according to the method mentioned in Japanese Patent Application Kokai (Laid-Open) No. 50-121243, too. Thus, they can be produced by reacting an ester such as diphenyl ester, dibenzyl ester or the like of hydroxy-dicarboxybenzene with a fluoroalkene oligomer such as fluoropropene trimer, tetrafluorethylene pentamer or the like in the presence of a proton acceptor, in an aprotic organic solvent, at a temperature close to room temperature or lower than it, in the presence of a basic catalyst such as triethylamine, followed by isolating the reaction product, hydrolyzing the reaction product in the presence of a basic compound such a sodium hydroxide, potassium hydroxide or the like, and then treating the hydrolyzate with an appropriate acid such as hydrochloric acid. The reaction product and the final product are purified by an appropriate means such as washing, recrystallization, and the like.

Examples of the perfluorononenyl group include a group of formula (A):

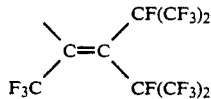
(A)

a group of formula (B):

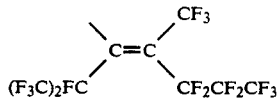
(B)

a group of formula (C):

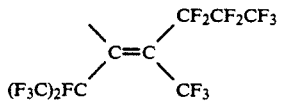
(C)

a group of formula (D):

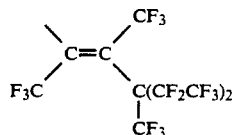
(D)

a group of formula (E):

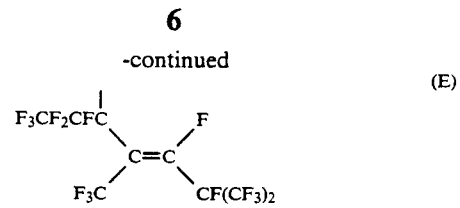
(E)

and the like. Examples of the perfluorohexenyl group include a group of formula (F):

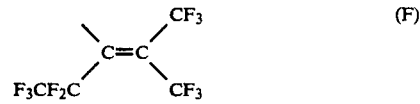
(F)

a group of formula (G):

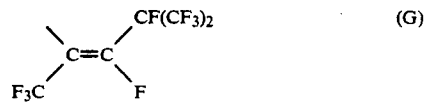
(G)

a group of formula (H):

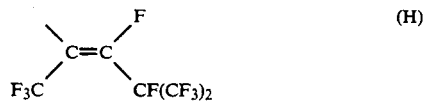
(H)

and the like. Examples of the perfluorodecenyl group include a group of formula (J):

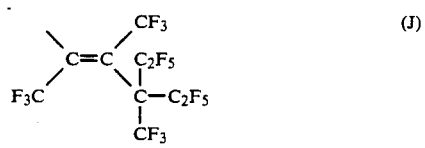
(J)

and the like.

In general formulas (I) and (III), Rf may be any of straight chain type and branched chain type. Since branched chain type groups are more compact than straight chain type groups in steric structure, glass transition temperature of polyamide is generally higher in case of branched chain type Rf than in case of straight chain type Rf.

Typical examples of the aromatic dicarboxylic acid represented by formula (IV) include phthalic acid, isophthalic acid, terephthalic acid, 3,3'-dicarboxyldiphenyl ether, 3,4'-dicarboxyldiphenyl ether, 4,4'-dicarboxyldiphenyl ether, 3,3'-dicarboxyldiphenylmethane, 3,4'-dicarboxyldiphenylmethane, 4,4'-dicarboxyldiphenylmethane, 3,3'-dicarboxyldiphenyldifluoromethane, 3,4'-dicarboxyldiphenyldifluoromethane, 3,3'-dicarboxyldiphenyl sulfone, 3,4'-dicarboxyldiphenyl sulfone, 4,4'-dicarboxyldiphenyl sulfone, 3,3'-dicarboxyldiphenyl sulfide, 3,4'-dicarboxyldiphenyl sulfide, 4,4'-dicarboxyldiphenyl sulfide, 3,3'-dicarboxyldiphenyl ketone, 3,4'-dicarboxyldiphenyl ketone, 4,4'-dicarboxyldiphenyl ketone, 2,2-bis(2-carboxylphenyl)propane, 2,2-(3,4'-dicarboxyldiphenyl)-propane, 2,2-bis(4-carboxylphenyl)-propane, 2,2-bis(3-carboxylphenyl)hexafluoropropane, 2,2-(3,4'-dicarboxyldiphenyl)hexafluoropropane, 2,2-bis(4-carboxylphenyl)-hexafluoropropane, 1,3-bis(3-carboxylphenoxy)-benzene, 1,4-bis(3- carboxylphenoxy)-benzene, 1,4-bis(4-carboxylphenoxy)-benzene, 3,3'-(1,4-phenylenebis(1-methylethylidene))-bisbenzoic acid, 3,4'-(1,4-phenylenebis(1-methylethylidene))-bisbenzoic acid, 4,4'-(1,4-phenylenebis(1-methylethylidene))-bisbenzoic acid, 2,2-bis(4-(3-carboxylphenoxy)-phenyl)-propane, 2,2-bis(4-(4-carboxylphenoxy)-phenyl)-propane, 2,2-bis(4-(3-carboxylphenoxy)-phenyl)-hexafluoropropane, 2,2-bis(4-(4-carboxylphenoxy)-phenyl)-hexafluoropropane, bis(4-(3-carboxylphenoxy)-phenyl) sulfide, bis(4-(4-carboxylphenoxy)-phenyl) sulfide, bis(4-(3-carboxylphenoxy)-phenyl) sulfone, bis(4-(4-carboxylphenoxy)phenyl) sulfone, and the like.

The terms "amide-formable derivative" of the aromatic dicarboxylic acids represented by formulas (III) and (IV) means a derivative thereof which can form an amide bond upon reaction with a diamine represented by formula (V). Such derivatives include acid halogenides such as dichloride, dibromide and the like of the aromatic dicarboxylic acids, dialkyl esters such as dimethyl ester, diethyl ester and the like of the acids, acid anhydrides of the acids, and the like.

Said dichlorides can be obtained in a high yield by reacting thionyl chloride with the above-mentioned perfluoroalkenyloxyisophthalic acid or the above-mentioned aromatic dicarboxylic acids.

Said dialkyl esters such as dimethyl ester, diethyl ester and the like can be obtained by reacting the above-mentioned perfluoroalkenyloxyisophthalic acid or the above-mentioned aromatic dicarboxylic acids with the corresponding alcohols such as methanol, ethanol and the like in the presence of an acid catalyst.

Typical examples of the aromatic diamine component represented by formula (V) include aromatic diamines such as o-phenylenediamine, m-phenylenediamine, p-phenylenediamine, 3,3'-diaminodiphenyl ether, 3,4'-diaminodiphenyl ether, 4,4'-diaminodiphenyl ether, 3,3'-diaminodiphenylmethane, 3,4'-diaminodiphenylmethane, 4,4'-diaminodiphenylmethane, 3,3'-diamindiphenyldifluoromethane, 3,4'-diaminodiphenyldifluoromethane, 4,4'-diaminodiphenyldifluoromethane, 3,3'-diaminodiphenyl sulfone, 3,4'-diaminodiphenyl sulfone, 4,4'-diaminodiphenyl sulfone, 3,3'-diaminodiphenyl sulfide, 3,4'-diaminodiphenyl sulfide, 4,4'-diaminodiphenyl sulfide, 3,3'-diaminodiphenyl ketone, 3,4'-diaminodiphenyl ketone, 4,4'-diaminodiphenyl ketone, 2,2-bis(3-aminophenyl)-propane, 2,2-(3,4'-diaminodiphenyl)propane, 2,2-(4-aminodiphenyl)-propane, 2,2-bis(3-aminophenyl)-hexafluoropropane, 2,2-(3,4'-diaminodiphenyl)-hexafluoropropane, 2,2-bis(4-aminophenyl)hexafluoropropane, 1,3-bis(3-aminophenoxy)-benzene, 1,4-bis(3-aminophenoxy)-benzene, 1,4-bis(4-aminophenoxy)benzene, 3,3'-(1,4-phenylenebis(1-methylethylidene))bisaniline, 3,4'-(1,4-phenylenebis(1-methylethylidene))bisaniline, 4,4-(1,4-phenylenebis(1-methylethylidene))bisaniline, 2,2-bis(4-(3-aminophenoxy)-phenyl)-propane, 2,2-bis(4-(4-aminophenoxy)-phenyl)-propane, 2,2-bis(4-(3-aminophenoxy)-phenyl)-hexafluoropropane, 2,2-bis(4-(4-aminophenoxy)-phenyl)-hexafluoropropane, bis(4(3-aminophenoxy)-phenyl) sulfide, bis(4-(4-aminophenoxy)-phenyl) sulfide, bis(4-(3-aminophenoxy)-phenyl) sulfone, bis(4-(4-aminophenoxy)-phenyl) sulfone and the like, and N-trialkylsilyl group-substituted diamines derived from the above-mentioned aromatic diamines.

As said trialkylsilyl group, trimethylsilyl, triethylsilyl, tripropylsilyl and the like can be referred to.

The condensation reaction between the above-mentioned aromatic dicarboxylic acid component and the above-mentioned aromatic diamine component can be carried out in an aprotic organic solvent in the presence or absence of a hydrogen chloride trapping agent, an activator, etc.

In this condensation reaction, the aromatic dicarboxylic acid component and the aromatic diamine component are preferably used in an equimolar relation or in a nearly equimolar relation. The order of addition of the components may be arbitrarily decided.

Concrete examples of the aprotic organic solvent include amide type solvents such as dimethylacetamide, N-methyl-2-pyrrolidone, tetramethylurea, hexamethylphosphoramide and the like; aromatic solvents such as benzene, toluene, anisole, nitrobenzene, benzonitrile and the like; ethereal solvents such as dibutyl ether, tetrahydrofuran, dioxane, di(methoxyethyl) ether and the like; halogenated hydrocarbon solvents such as chloroform and the like; etc. Among these organic solvents, dimethylacetamide and N-methyl-2-pyrrolidone are preferably used in order to obtain a polyamide of high degree of polymerization.

The hydrogen chloride trapping agent is used for the purpose of neutralizing the hydrogen chloride formed by the condensation reaction. Preferably, bases such as pyridine, triethylamine, dimethylaniline and the like are used for this purpose. The hydrogen chloride trapping agent is preferably used in an amount of 0.8–3 equivalents and particularly 1–1.5 equivalents, per one equivalent of the aromatic dicarboxylic acid component or diamine component.

Said activator is used for the purpose of activating the aromatic dicarboxylic acid component. Preferably, dicyclohexylcarbodiimide, polyphosphoric acid, imidazole and the like are used for this purpose. The activator is used preferably in an amount of 0.8–3 equivalents and particularly 1–1.5 equivalents, per one equivalent of the aromatic dicarboxylic acid component or diamine component.

The process for producing the polyamide of this invention will be illustrated below more concretely. For example, usual low temperature solution polycondensation process, interfacial polycondensation process, direct polycondensation process and the like can be used for this purpose. Among these processes, low temperature solution polycondensation process is carried out in the following manner. Thus, an aromatic diamine component is dissolved into an aprotic organic solvent optionally together with a hydrogen chloride trapping agent. Then, while stirring the solution usually at a temperature of about $-50°$ C. to $+80°$ C., preferably at a temperature of $-20°$ C. to $+50°$ C., an acid halogenide compound such as di-(acid chloride), di(acid bromide) and the like as a dicarboxylic acid component is added and reacted in the form of powder or a solution in aprotic organic solvent either at once or slowly. The reaction immediately takes place and viscosity of the reaction system increases. Usually, the stirring is continued for 1–24 hours. After completion of the reaction, the reaction mixture itself can be used as a forming material as it is. Otherwise, the polymer may be isolated therefrom by a treatment using methanol, water or the like.

The interfacial polycondensation process is carried out after dissolving an acid halaogenide such as di-(acid chloride), di-(acid bromide) and the like as a dicarboxylic acid component and an aromatic diamine component into respective solvents which are immiscible with each other. For example, a solution of an aromatic diamine component in a 2-5 weight % aqueous solution of alkali such as NaOH or KOH is added onto a solution of a di-(acid chloride) in carbon tetrachloride, chloroform or the like, whereby a polycondensation reaction immediately takes place at the interfacial layer to deposit a polymer. By continuously drawing out the deposited matter, a polymer can be obtained.

The direct polycondensation process is carried out by dissolving a dicarboxylic acid as an aromatic dicarboxylic acid component and an aromatic diamine component into an organic solvent and adding thereto dicyclohexylcarbodiimide, polyphosphric acid, imidazole or the like as an activator.

Preferably, the fluorine-containing aromatic polyamide of this invention has a reduced viscosity of 0.01 dl/g or above, particularly 0.04 dl/g or above, as measured at 30° C. on a solution having a concentration of 0.1 dl/g in dimethylacetamide (DMAc). Particularly when a film is formed from the fluorine-containing aromatic polyamide, its reduced viscosity should preferably be 0.1 dl/g or above.

The fluorine-containing aromatic polyamide of this invention exhibits an excellent water-repellency. In order that the aromatic polyamide exhibits an excellent water-repellency, its fluorine content originated from Rf in formula (I) should preferably be 10% by weight or above and particularly 15% by weight or above.

The fluorine-containing aromatic polyamide of this invention is useful as a coating material. Further, it can be made into a film by the hitherto known casting process or the like.

Next, this invention will be illustrated by way of the following examples. This invention is by no means limited by these examples.

EXAMPLE 1

Into a reactor equipped with a stirrer was fed 0.540 g (5.00 mmoles) of p-phenylendiamine as an aromatic diamine component together with 0.948 g (12.0 mmoles) of pyridine and 30.0 g of dimethylacetamide (hereinafter abbreviated to DMAc). The content of the reactor was cooled to 5° C. in an ice water bath. Next, as an aromatic dicarboxylic acid component, 3.25 g (5.00 mmoles) of 5-(perfluorononenyloxy)-isophthalic acid dichloride having a group of formula (A) mentioned above as a perfluorononenyloxy group was added into the reactor with stirring. After stirring the resulting mixture for 5 hours, the reacted mixture was poured into a large quantity of methanol. The resulting precipitate was collected by filtration and several times washed with methanol to obtain 3.34 g of Polyamide (1) as a white-colored solid product. Table 1 illustrates yield and reduced viscosity of Polyamide (1), and Table 3 illustrates its properties.

EXAMPLES 2-15

Polymers were synthesized according to the procedure of Example 1, except that the aromatic diamine component was varied while the 5-(perfluorononenyloxy)-isophthalic acid dichloride was unchangingly used as the aromatic dicarboxylic acid component throughout all the runs. The aromatic dicarboxylic acid component and the aromatic diamine component were used in an equimolar relationship. The kinds of aromatic diamine component, the yields of formed Polyamides (2)-(15) and their reduced viscosities are listed in Table 1, and properties of Polyamides (2)-(15) are summarized in Table 3.

TABLE 1

Amine component, yield and reduced viscosity

| Polyamide | Aromatic diamine Component | Polymer yield (%) | Reduced viscosity (dl/g) |
| --- | --- | --- | --- |
| (1) | p-Phenylenediamine | 90 | 0.09 |
| (2) | 4,4'-Diaminodiphenyl ether | 90 | 0.09 |
| (3) | 4,4'-Diaminodiphenylmethane | 92 | 0.12 |
| (4) | 4,4'-Diaminodiphenyl-difluoromethane | 91 | 0.10 |
| (5) | 4,4'-Diaminodiphenyl sulfone | 90 | 0.10 |
| (6) | 4,4'-Diaminodiphenyl sulfide | 92 | 0.12 |
| (7) | 4,4'-Diaminodiphenyl ketone | 91 | 0.11 |
| (8) | 2,2-Bis(4-aminophenyl)-propane | 92 | 0.12 |
| (9) | 2,2-Bis(4-aminophenyl)-hexafluoropropane | 91 | 0.04 |
| (10) | 1,4-Bis(4-aminophenoxy)-benzene | 92 | 0.12 |
| (11) | 4,4'-(1,4-Phenylenebis(1-methylethylidene))-bisaniline | 92 | 0.12 |
| (12) | 2,2-Bis(4-(4-aminophenoxy)-phenyl)-propane | 92 | 0.12 |
| (13) | 2,2-Bis(4-(4-aminophenoxy)-phenyl)-hexafluoropropane | 92 | 0.09 |
| (14) | Bis(4-(4-aminophenoxy)-phenyl)sulfide | 92 | 0.11 |
| (15) | Bis(4-(4-aminophenoxy)-phenyl)sulfone | 92 | 0.10 |

In Table 1, reduced viscosities 1) were measured at 30° C. on a 0.1 g/dl polyamide solution in DMAc.

EXAMPLE 16

Into a reactor equipped with a stirrer were fed 1.03 g (3.00 mmoles) of N,N'-bis(trimethylsilyl)bis(4-aminophenyl) ether, 0.474 g (6.00 mmoles) of pyridine and 6 ml of DMAc. After cooling the content of the reactor to 5° C. in an ice bath, 1.95 g (3.00 mmoles) of 5-(perfluorononenyloxy)-isophthalic acid dichloride (hereinafter abbreviated to PFIP) having a group of formula (A) mentioned above as a perfluorononenyloxy group was added into the reactor with stirring. After stirring the resulting mixture for 5 hours, the reacted solution was poured into a large quantity of methanol, and the resulting precipitate was collected by filtration and several times washed with methanol to obtain 2.16 g of Polyamide (16) as a white-colored solid product.

Yield and reduced viscosity of Polyamide (16) are shown in Table 2, and its properties are shown in Table 3.

EXAMPLES 17-19

According to the procedure mentioned in Example 16, polymers were synthesized by using a mixture of PFIP and isophthalic acid dichloride (hereinafter abbreviated to IP) as an aromatic dicarboxylic acid component while unchangingly using N,N'-bis(trimethylsilyl)-bis(4-aminophenyl) ether as aromatic diamine component throughout all the runs. Molar ratios PFIP/IP in the charged mixtures, yields of Polyamides (17)-(19) and their reduced viscosities are listed in Table 2, and properties of Polyamides (17)-(19) are summarized in Table 3.

COMPARATIVE EXAMPLE 1

Into a reactor equipped with a stirrer were fed 1.03 g (3.00 mmoles) of N,N'-bis(trimethylsilyl)bis(4-aminophenyl) ether, 0.474 g (6.00 mmoles) of pyridine and 6 ml of DMAc. The content of the reactor was cooled to 5° C. in an ice bath. Then, 0.609 g (3.00 mmoles) of IP was added into the resulting solution with stirring. After stirring it for 5 hours, the reacted solution was poured into a large quantity of methanol, and the resulting precipitate was collected by filtration and several times washed with methanol to obtain 0.992 g of Polyamide (20) as a white-colored solid product. Yield and reduced viscosity of Polyamide (20) are shown in Table 2 and its properties are shown in Table 3.

TABLE 2

Feed ratio, yield and reduced viscosity

| Poly-amide | Feed ratio of aromatic dicarboxylic acid component (% by mole) | | Polymer yield (%) | Reduced viscosity 1) (dl/g) | Fluorine content (% by wt.) |
|---|---|---|---|---|---|
| | PFIP | IP | | | |
| (16) | 100 | 0 | 92 | 0.91 | 41.6 |
| (17) | 70 | 30 | 96 | 1.26 | 35.2 |
| (18) | 50 | 50 | 96 | 1.38 | 29.2 |
| (19) | 30 | 70 | 97 | 1.71 | 20.9 |
| (20) | 0 | 100 | 99 | 1.88 | 0 |

1) Reduced viscosity: Measured at a concentration of 0.1 g/dl in DMAc at 30° C.

COMPARATIVE EXAMPLE 2

Into a reactor equipped with a stirrer were introduced 1.00 g (3.00 mmoles) of 2,2-bis(4-aminophenyl)-hexafluoropropane, 0.474 g (6.00 mmoles) of pyridine and 6 ml fo DMAc. The content of the reactor was cooled to 5° C. in an ice bath, to which was added 0.609 g (3.00 mmoles) of IP with stirring. After stirring the mixture for 5 hours, the reacted solution was poured into a large quantity of methanol, and the resulting precipitate was collected by filtration and several times washed with methanol to obtain Polyamide (21) as a white-colored solid product.

Yield of Polyamide (21) was 93%, and its reduced viscosity was 0.44 dl/g. Properties of Polyamide (21) are shown in Table 3. This polyamide had a fluorine content of 24.6% by weight.

COMPARATIVE EXAMPLE 3

The procedure of Comparative Example 2 was repeated, except that the 1.00 g (3.00 mmoles) of 2,2-bis(4-aminophenyl)-hexafluoropropane was replaced by 1.55 g (3.00 mmoles) of 2,2-bis(4-aminophenoxy)phenylhexafluoropropane. Thus, 2.25 g of Polyamide (22) was obtained as a white-colored solid product.

Yield of Polyamide (22) was 92%, and its reduced viscosity was 0.63 dl/g. Properties of Polyamide (22) are shown in Table 3. This polyamide had a fluorine content of 18.5% by weight.

TABLE 3

Properties of polyamides

| | Main peaks in IR spectrum (cm$^{-1}$) | 5% weight loss temperature (°C.) | Contact angle[2] (degree) | Water absorption[3] |
|---|---|---|---|---|
| (1) | C=O(1668), C—F(1238), N—H(1510) | 380 | 101.0 | 0.4 |
| (2) | C=O(1670), C—F(1240), N—H(1512) | 378 | 102.0 | 0.3 |
| (3) | C=O(1670), C—F(1238), N—H(1512) | 372 | 102.0 | 0.3 |
| (4) | C=O(1668), C—F(1242), N—H(1510) | 384 | 102.4 | 0.3 |
| (5) | C=O(1666), C—F(1240), N—H(1508) | 376 | 100.8 | 0.4 |
| (6) | C=O(1670), C—F(1241), N—H(1512) | 374 | 99.8 | 0.5 |
| (7) | C=O(1672), C—F(1240), N—H(1515) | 372 | 99.6 | 0.6 |
| (8) | C=O(1674), C—F(1240), N—H(1520) | 380 | 100.6 | 0.4 |
| (9) | C=O(1674), C—F(1244), N—H(1522) | 407 | 102.5 | 0.3 |
| (10) | C=O(1676), C—F(1242), N—H(1520) | 395 | 101.8 | 0.3 |
| (11) | C=O(1678), C—F(1240), N—H(1524) | 380 | 101.5 | 0.3 |
| (12) | C=O(1680), C—F(1241), N—H(1520) | 378 | 100.6 | 0.4 |
| (13) | C=O(1684), C—F(1242), N—H(1506) | 385 | 102.2 | 0.3 |
| (14) | C=O(1674), C—F(1238), N—H(1515) | 375 | 100.2 | 0.4 |
| (15) | C=O(1676), C—F(1240), N—H(1510) | 370 | 100.7 | 0.4 |
| (16) | C=O(1670), C—F(1240), N—H(1502) | 388 | 102.5 | 0.3 |
| (17) | C=O(1666), C—F(1240), N—H(1502) | 378 | 99.2 | 1.0 |
| (18) | C=O(1664), C—F(1235), N—H(1500) | 375 | 98.3 | 2.1 |
| (19) | C=O(1660), C—F(1232), N—H(1500) | 373 | 98.1 | 2.8 |
| (20) | C=O(1652), —O—(1230), N—H(1498) | 440 | 70.7 | 5.2 |
| (21) | C=O(1674), N—H(1522), C—F(1244) | 456 | 86 | 4.2 |
| (22) | C=O(1684), N—H(1506), C—F(1242) | 475 | 88 | 4.0 |

Notes)
(20): Comparative Example 1
(21): Comparative Example 2
(22): Comparative Example 3
[1] 5% weight loss temperature was measured by thermogravimetry at a heating rate of 10° C./min.
[2] Contact angle means contact angle of water at 20° C.
[3] Water absorption signifies percent increase in weight after drying sample at 120° C. for 3 hours under reduced pressure and then dipping it in distilled water for 24 hours.

Figure 2:
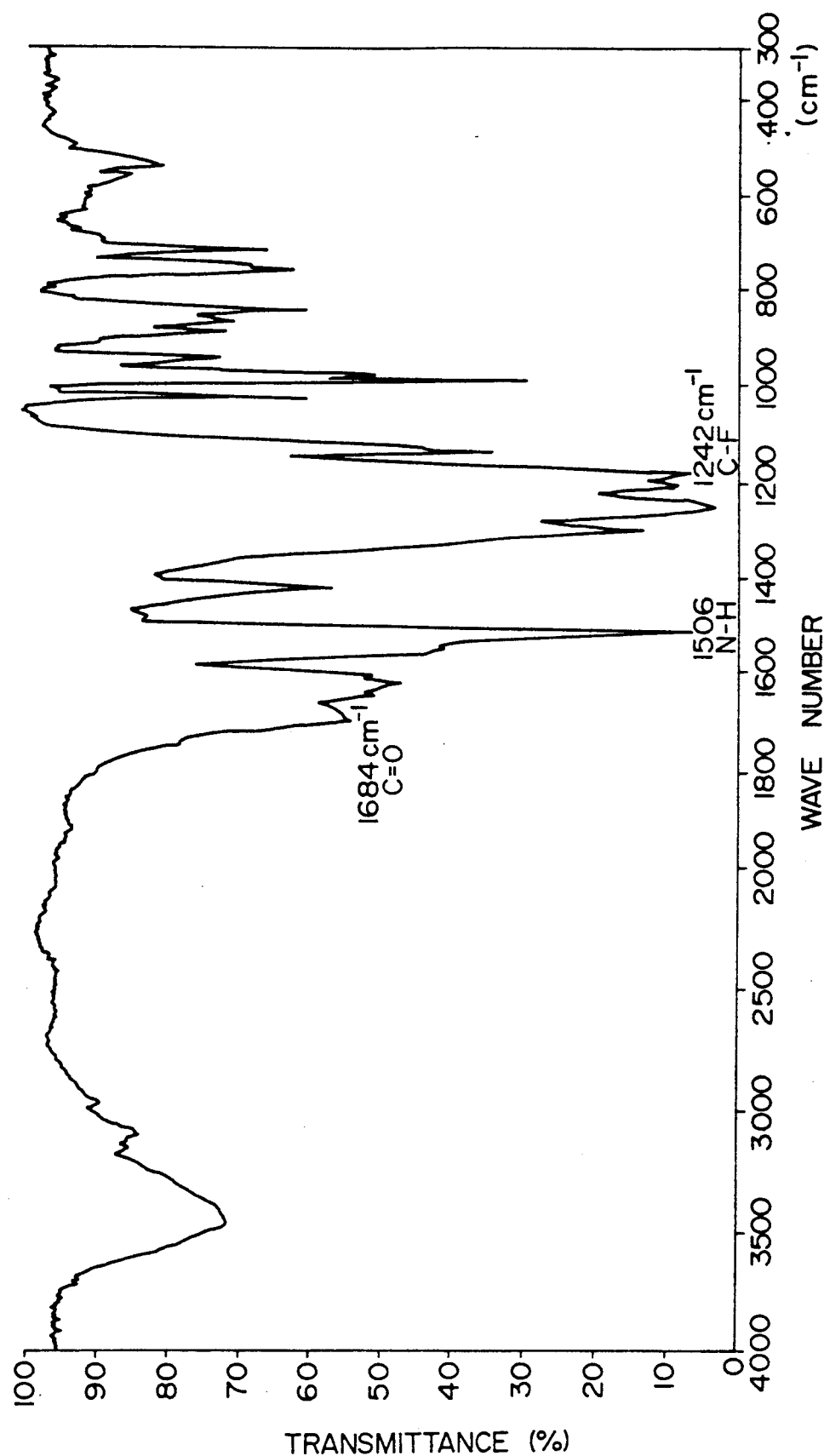
FIG. 2 illustrates infrared absorption spectrum of Polyamide (13) obtained in Example 13.

FIG. 1, FIG. 2 and FIG. 3 illustrate the infrared absorption spectra of the polyamides obtained in Example 9, Example 13 and Example 16, respectively.

Polyamides (1)–(15) obtained in Example 1 to Example 15 have repeating units of the formula (I) wherein Rf is a group represented by the following formula:

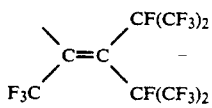

and X is a group shown in the following Table 4:

TABLE 4

| Polyamide | Group in repeating units X in formula (I) |
|---|---|
| (1) | —⌬— |
| (2) | —⌬—O—⌬— |
| (3) | —⌬—CH₂—⌬— |
| (4) | —⌬—CF₂—⌬— |
| (5) | —⌬—SO₂—⌬— |
| (6) | —⌬—S—⌬— |
| (7) | —⌬—C(=O)—⌬— |
| (8) | —⌬—C(CH₃)(CF₃)—⌬— |
| (9) | —⌬—C(CF₃)(CF₃)—⌬— |
| (10) | —⌬—O—⌬—O—⌬— |
| (11) | —⌬—O—⌬(C(CH₃)₂)—⌬— with C(CH₃)₂ |
| (12) | —⌬—O—⌬—C(CH₃)₂—⌬—O—⌬— |
| (13) | —⌬—O—⌬—C(CF₃)₂—⌬—O—⌬— |
| (14) | —⌬—O—⌬—S—⌬—O—⌬— |
| (15) | —⌬—O—⌬—SO₂—⌬—O—⌬— |

Polyamides (16)-(20) obtained in Examples 16-19 and Comparative Example 1 have repeating units of formula (VI) and repeating units of formula (VII) at a ratio shown in Table 5:

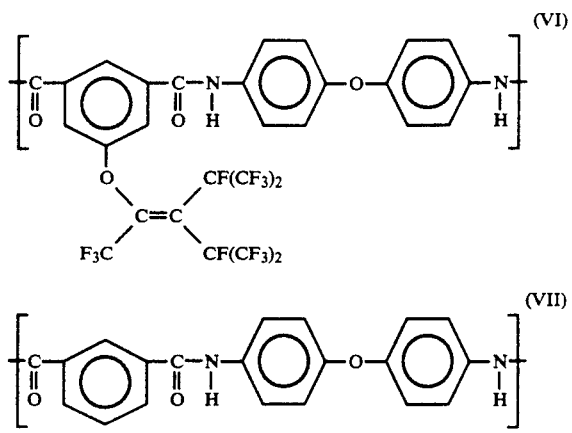

TABLE 5

| | Proportion of repeating units | |
|---|---|---|
| | Repeating unit | |
| Polamide | (VI) | (VII) |
| (16) | 100% by mole | 0% by mole |
| (17) | 70 | 30 |
| (18) | 50 | 50 |
| (19) | 30 | 70 |
| (20) | 0 | 100 |

Note: Since Polyamides (17)-(19) were obtained in high yields, the compositions of polyamides were dependent only on their feed ratios.

The 5-(perfluorononenyloxy)-isophthalic acid dichloride used in the examples is a compound represented by the following formula:

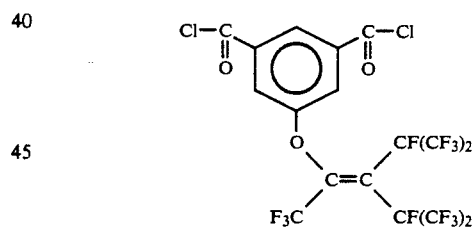

which was synthesized by reacting one mole of 5-(perfluorononenyloxy)-isophthalic acid having group (A) as a perfluorononenyl group with 10 moles of thionyl chloride at 80° C. for 12 hours, distilling off the excessive thionyl chloride and fractionating the product. The objective compound thus obtained had a boiling point of 114° C./0.3 mm Hg.

The fluorine-containing polyamides having repeating units of the formula (I) or repeating units of the formulae (I) and (II) are novel compounds. They are excellent in water-repellency and water resistance, and particularly in water-repellency. Further, the fluorine-containing polyamide having repeating units of the formula (I) wherein X is a phenylene group or a group of the formulae (a) to (c) is additionally superior in heat resistance to that having an ordinary divalent organic group, and the fluorine-containing polyamide having repeating units of the formulae (I) and (III) wherein X is a phenylene group or a group of the formulae (a) to (c) is additionally superior in heat resistance to that having no such an X group.

All these fluorine-containing polyamides can easily be synthesized according to the process of the present invention.

What is claimed is:

1. A fluorine-containing aromatic polyamide having repeating units represented by the formula:

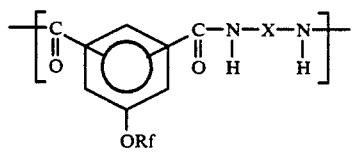 (I)

wherein Rf represents —$C_nF_{2n-1}$, n is an integer of 6 to 12, which has one double bond and is unbranched or branched, provided that the hydrogen atoms of benzene ring are optionally substituted; and X represents a divalent organic group.

2. A fluorine-containing aromatic polyamide having repeating units represented by the formula:

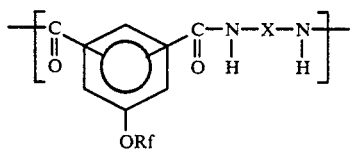 (I)

wherein Rf represents —$C_nF_{2n-1}$, n is an integer of 6 to 12, which has one double bond and is unbranched or branched, provided that the hydrogen atoms of benzene ring are optionally substituted; and X represents a divalent organic group, and repeating units represented by the formula:

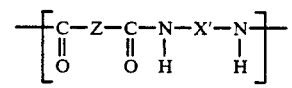 (II)

wherein Z represents a divalent organic group having an aromatic ring, provided that Z is different from the

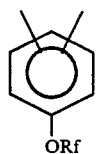

in the formula (I), and X' represents a divalent organic group having an aromatic ring.

3. A fluorine-containing aromatic polyamide according to claim 2, which comprises 1–99% by mole of the repeating unit represented by formula (I) and 1–99% by mole of the repeating unit represented by formula (II).

4. A fluorine-containing aromatic polyamide according to claim 1, wherein the repeating unit represented by formula (I) is a repeating unit of formula (I) wherein Rf is branched.

5. A fluorine-containing aromatic polyamide according to claim 1, wherein the repeating unit represented by formula (I) is a repeating unit of formula (I) wherein Rf is a group of the following formula (A):

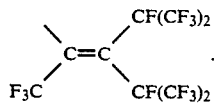 (A)

6. A fluorine-containing aromatic polyamide according to claim 1, wherein the fluorine content in said aromatic polyamide is 10% by weight or above.

7. A fluorine-containing aromatic polyamide according to claim 1, wherein in the formula (I), X represents a phenylene group, or a group represented by the formula:

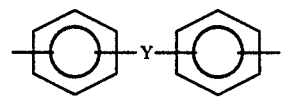 (a)

wherein Y represents a direct link or Y is —O—, —S—, —$SO_2$—,

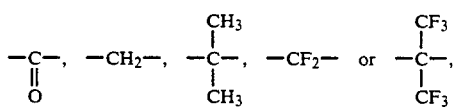

or a group represented by the formula:

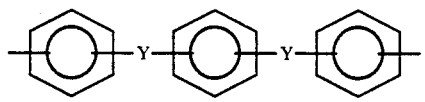 (b)

wherein Y is as defined above and the groups or linkage represented by Y in the formula (b) are identical or different from each other, or a group represented by the formula:

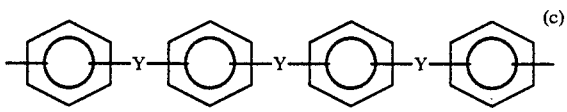 (c)

wherein Y is as defined above and the groups or linkage represented by Y in formula (c) are identical or different from one another, provided that in these groups the hydrogen atoms of benzene rings are optionally substituted.

8. A fluorine-containing aromatic polyamide according to claim 2, wherein the polyamide comprises repeating units (a) represented by the formula:

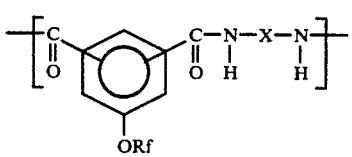 (I)

wherein X represents a phenylene group, a group of the formula:

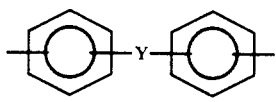

(a)

wherein Y represents a direct link or Y is —O—, —S—, —SO₂—,

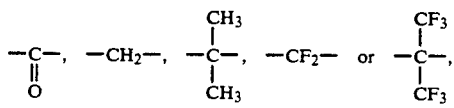

or a group of the formula:

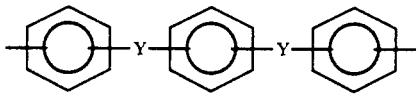

(b)

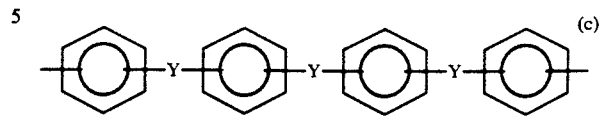

(c)

wherein Y is as defined above and the groups or linkage represented by Y in formula (b) are identical or different, or a group of the formula:

wherein Y is as defined above and the groups or linkage represented by Y in the formula (c) are identical or different, provided that in these formulas the hydrogen atoms of benzene ring are optionally substituted, and repeating units (β) represented by the formula:

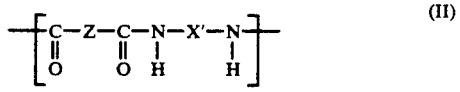

(II)

wherein Z and X' independently represent a phenylene group, a group of the formula (a), a group of the formula (b) or a group of the formula (c), provided that in these groups the hydrogen atoms of benzene ring are optionally substituted.

* * * * *